United States Patent
Eveleigh

(10) Patent No.: US 6,637,668 B2
(45) Date of Patent: Oct. 28, 2003

(54) THERMOSTATIC CONTROL VALVE WITH FLUID MIXING

(75) Inventor: Robert B. Eveleigh, Indianapolis, IN (US)

(73) Assignee: Magarl, LLC, Indianapolis, IN (US)

(*) Notice: Subject to any disclaimer, the term of this patent is extended or adjusted under 35 U.S.C. 154(b) by 0 days.

(21) Appl. No.: 09/999,810

(22) Filed: Oct. 24, 2001

(65) Prior Publication Data

US 2003/0075611 A1 Apr. 24, 2003

(51) Int. Cl.[7] .......................... G05D 23/02; G05D 23/12
(52) U.S. Cl. ..................................... 236/12.26; 236/101
(58) Field of Search .......................... 236/12.1, 12.16, 236/12.2, 101 D; 251/127; 366/181.5

(56) References Cited

U.S. PATENT DOCUMENTS

| | | | | |
|---|---|---|---|---|
| 3,337,194 A | * | 8/1967 | Zavasnik et al. | 366/181.5 |
| 3,762,638 A | * | 10/1973 | Goldsmith | 236/12.2 |
| 4,021,021 A | * | 5/1977 | Hall et al. | 366/156.1 |
| 4,408,893 A | * | 10/1983 | Rice, III | 366/339 |
| 5,203,496 A | | 4/1993 | Kline | |
| 5,323,960 A | * | 6/1994 | Kline | 236/12.2 |
| 5,427,312 A | | 6/1995 | Simonov et al. | |
| 6,250,559 B1 | * | 6/2001 | Knauss | 236/12.2 |
| 6,361,202 B1 | * | 3/2002 | Lee et al. | 366/137 |

* cited by examiner

Primary Examiner—William E. Tapolcai
Assistant Examiner—Mohammad M. Ali
(74) Attorney, Agent, or Firm—Maginot, Moore & Bowman LLP

(57) ABSTRACT

A thermostatic control valve assembly for use in continuously mixing a hot first fluid with a cold second fluid to continuously produce a mixed fluid at a constant temperature. The valve assembly includes an improved mixing dome defining a mixing chamber that facilitates thorough mixing of the hot and cold fluids over a wide range of flow rates, including rates as low as two gallons per minute. The improved mixing performance is accomplished by a plurality of baffles sequentially disposed along the flow path within the mixing chamber and extending at an angle in opposition to the flow path. Each baffle exhibits a paisley shape and is angularly displaced from the adjacent baffles to turn the fluid flow, thereby optimally mixing the hot and cold fluids over a wide range of flow rates while minimizing the pressure drop between the valve inlet and outlet.

27 Claims, 3 Drawing Sheets

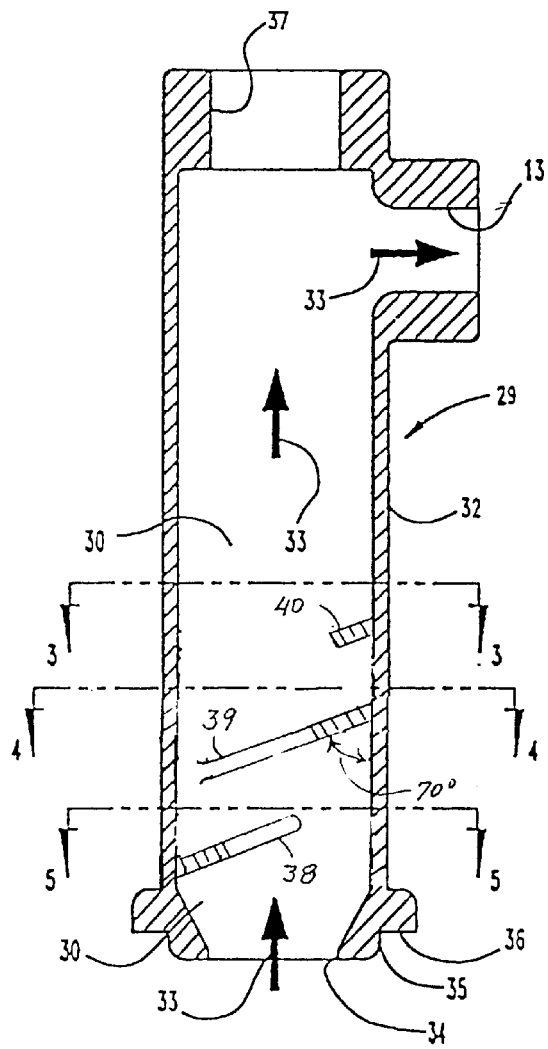
Fig. 2
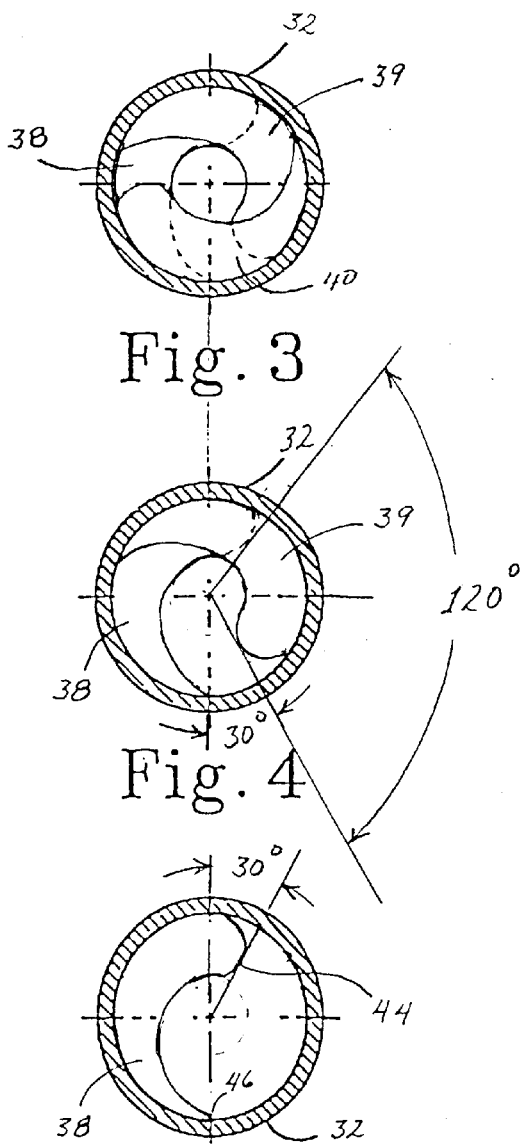
Fig. 3
Fig. 4
Fig. 5

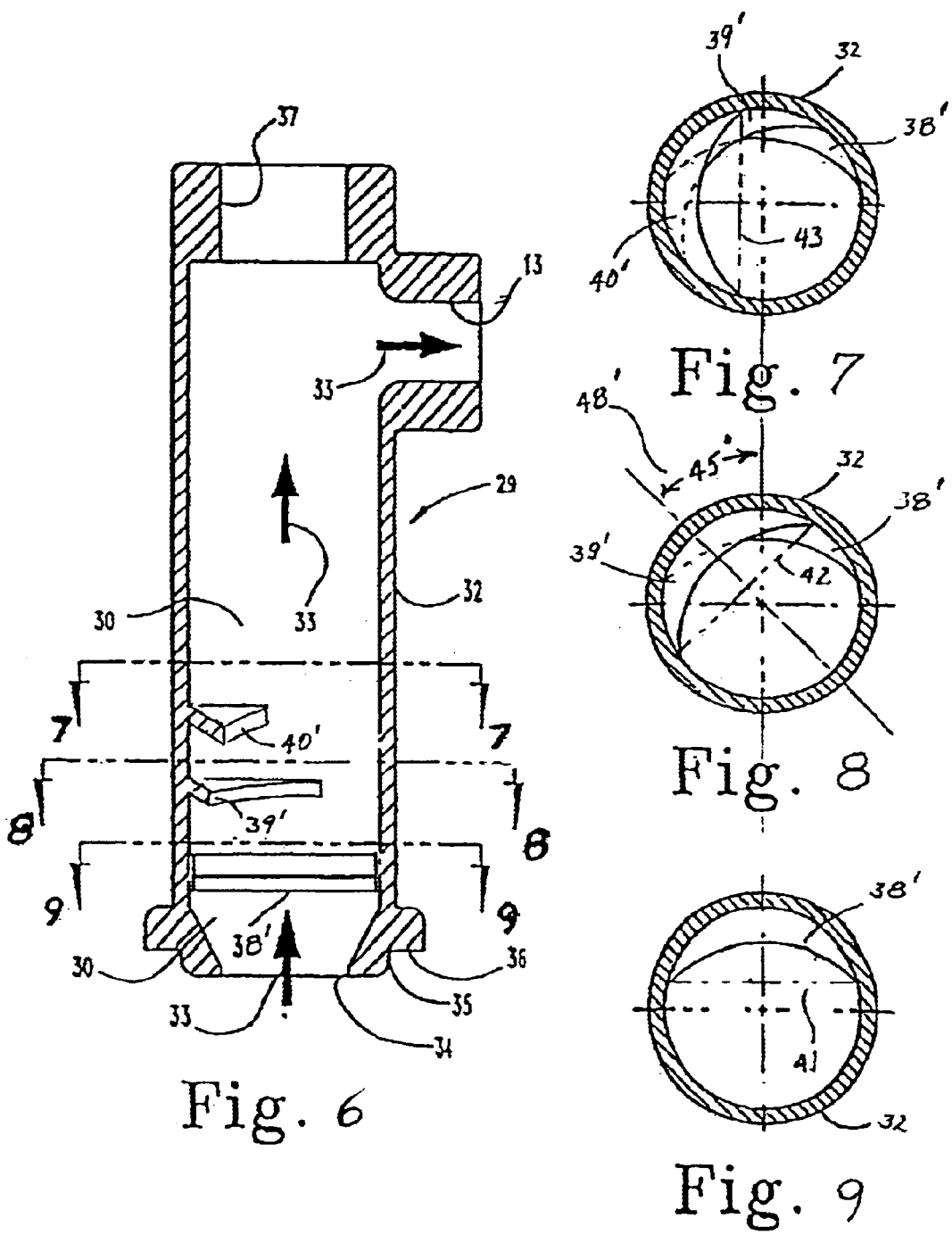

ent invention is to provide an improved thermostatic control valve assembly. A specific object is to provide a valve assembly that more efficiently mixes hot and cold fluids for accurately sensing the temperature of the mixture.

THERMOSTATIC CONTROL VALVE WITH FLUID MIXING

BACKGROUND OF THE INVENTION

The present invention relates to the field of fluid mixing valve assemblies. More particularly, the invention concerns an improved thermostatically controlled mixing valve assembly in which a thermostat is immersed in the fluid flowing through the valve.

Thermostatic control valve assemblies are well known in the art and have long been utilized in various applications including group showers, washing stations, hospital hydrotherapy installations and in many industrial applications where precision thermostatic water blending is essential. In order to operate properly, the hot and cold water entering such a valve assembly must be thoroughly blended before the temperature of the mixture is sensed by the thermostat. If the hot and cold water are not adequately mixed, the valve assembly can behave erratically because the temperature sensor sees pockets of hot and cold water instead of a mixture that is at a single temperature throughout. One problem that has long persisted in the art is the inability of most valve assemblies to adequately mix the hot and cold water over a wide range of flow rates. Consequently, multiple valves often have to be used to satisfy flow requirements.

Another problem that has persisted in the art is the physical size of the valve assembly required for a specific application. Often, the valve assembly is simply too large because of the need for a large mixing chamber to adequately mix the hot and cold water. What is needed is a thermostatic control valve assembly having an improved mixing chamber that has the ability to thoroughly mix the hot and cold water over a wide range of flow rates, and which does so in a smaller physical space than valve assemblies currently known in the art.

One such valve assembly featuring an improved mixing chamber is disclosed in U.S. Pat. No. 5,203,496 which is assigned to the assignee of the present invention. It is now desired to improve the operation of such valve assemblies by providing a mixing valve assembly which operates with reduced pressure drop across the valve assembly, while still thoroughly mixing the hot and cold fluids.

SUMMARY OF THE INVENTION

A thermostatic control valve assembly for continuously mixing a hot first fluid with a cold second fluid to continuously produce a mixed fluid at a constant temperature according to one embodiment of the present invention comprises a cold fluid inlet, a hot fluid inlet, a mixing dome defining a mixing chamber, a thermostatically controlled flow control valve and an operably connected thermostat for adjusting the flow of the hot and cold fluids into the mixing chamber. The mixing dome includes a plurality of baffles sequentially placed in the flow path to promote better mixing of the hot and cold fluids before the mixed fluid contacts the thermostat disposed in the fluid flow path.

In one aspect of the invention, each baffle projects into the flow stream and is angled from the mixing dome wall in a direction contrary to the direction of flow. The mixing performance is further improved by angularly displacing the each baffle with respect to each other to impart a twisting movement to the fluid. The mixing dome includes means for supporting the thermostat between the baffles and the fluid outlet of the dome.

A general object of the present invention is to provide an improved thermostatic control valve assembly. A specific object is to provide a valve assembly that more efficiently mixes hot and cold fluids for accurately sensing the temperature of the mixture.

A further objective is to provide a valve assembly that provides effectively mixed hot and cold fluids with reduced pressure drop between the valve and valve outlet. Related objects and advantages of the present invention will be apparent from the following description.

BRIEF DESCRIPTION OF THE DRAWINGS

FIG. 2 shows a side cross-sectional view of a housing defining an improved mixing chamber for the valve assembly shown in FIG. 1.

FIG. 3 is a top view along section 3—3 of FIG. 2 showing a first baffle according to the present invention.

FIG. 4 is a top view along section 4—4 of FIG. 2 showing a second baffle according to the present invention.

FIG. 5 is a top view along section 5—5 of FIG. 2 showing a third baffle according to the present invention.

FIG. 6 shows a side cross-sectional view of a housing defining an improved mixing chamber for a second embodiment of the present invention.

FIG. 7 is a top view along section 7—7 of FIG. 6 showing a fourth baffle according to the present invention.

FIG. 8 is a top view along section 8—8 of FIG. 6 showing a fifth baffle according to the present invention.

FIG. 9 is a top view along section 9—9 of FIG. 6 showing a sixth baffle according to the present invention.

DESCRIPTION OF THE PREFERRED EMBODIMENT

Figure 1:
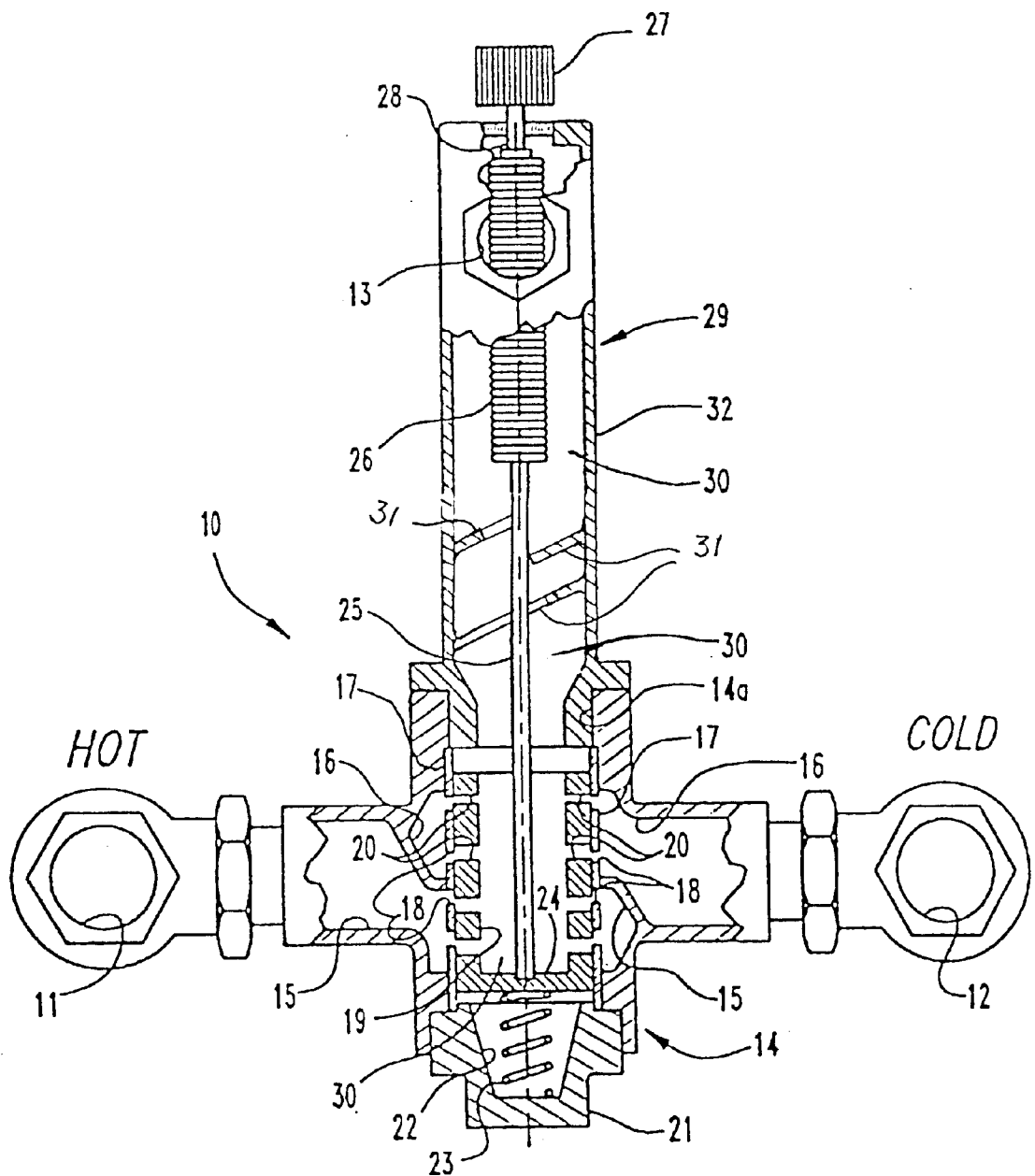
FIG. 1 shows a side cross-sectional view of a thermostatic control valve assembly according to a preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown a thermostatic control valve assembly 10 with fluid mixing according to the preferred embodiment of the present invention. Valve assembly 10 includes a hot inlet 11, a cold inlet 12 and an outlet 13. Inlets 11 and 12 are connected to opposite sides of flow control valve 14 and open to annular cavities 15 and 16, respectively, within the flow control valve. The inner wall of annular cavities 15 and 16 is defined by a cylindrically shaped liner 17. Liner 17 is open at both ends and includes a plurality of openings or slots 18 which are distributed around its circumference in communication with cavities 15 and 16.

Slidably mounted within liner 17 is a cylindrically shaped piston 19 which is open at its upper end. Piston 19 is preferably pressure balanced and includes a plurality of openings or slots 20 that are distributed around its circumference. Preferably, each opening 20 through piston 19 has a counterpart opening 18 in liner 17. Modulation of the piston 19 within the liner 17 variably opens the cavities 15 and 16 to the interior of the piston 19, which communicates the combined hot and cold fluid to the outlet 14a of the flow control valve.

Flow control valve 14 also includes a bottom plug 21 which can be removed to allow access to repair, replace or clean the interior parts of flow control valve 14. Bottom plug 21 defines a cavity 22 therein which substantially receives compressed valve spring 23. Valve spring 23 is supported at one end by bottom plug 21 and is connected at its other end to the base 24 of piston 19. The spring 23 applies a return force to piston 19.

A push rod 25 extends through the liner 17 and piston 19 to engage the base 24. The opposite end of push rod 25 is connected to a thermostat 26. Thermostat 26 can be of many types known in the art, such as a thermal coil or a temperature sensitive bellows. Such a thermostat is designed to expand or contract along the axis defined by push rod 25 in linear proportion to a change in the temperature of fluid surrounding the thermostat. In this embodiment, thermostat 26 is connected to adjustment screw 27 via shaft 28. Adjustment screw 27 acts against spring 23 and thus allows the vertical position of the thermostat 26, and ultimately of the piston 19, to be adjusted, which in turn alters the relative proportions of hot and cold fluid passing through openings 20.

One problem that has persisted in the art is the inability of valve assemblies to operate properly over a wide range of flow rates. In other words, a flow control valve assembly is only useful over the range of flow rates that the device is able to thoroughly blend the hot and cold fluids before the mixture contacts the thermostat. While many known mixing valve assemblies are capable of adequate fluid mixing at high flows, a need remains for a valve assembly that is also capable of thorough hot and cold fluid mixing at low flow rates, such as below 10 g.p.m.

FIG. 1 illustrates one form of control valve assembly that may utilize the features of the present invention. It is understood that the invention can have application with a variety of thermostat control valve configurations. In the illustrated embodiment, a mixing dome 29 is engaged over the outlet 14a of the flow control valve 14. The mixing dome 29 defines a mixing chamber 30 therein which is preferably cylindrical in configuration. An important feature of the present invention is the incorporation within the mixing dome 29 of means for turning or rotating the fluid flow through the mixing chamber 30 to ensure complete mixing of the hot and cold fluid before it reaches the thermostat 26. Complete fluid mixing assures a uniform temperature throughout the fluid discharged through outlet 13. Most importantly, the mixed fluid accurately reflects the exiting temperature of the fluid so the thermostat can accurately regulate the movement of the valve control elements.

According to the invention, the means for turning the fluid includes a plurality of baffles 31 that are integrally formed as part of the housing 32 forming the mixing dome. The shape and relative arrangement of baffles 31 are intended to induce more thorough blending of the hot and cold fluids in mixing chamber 30 before the mixture contacts thermostat 26, particularly at low flow rates where the problem of inadequate mixing is most prevalent.

In order to reliably react to a change in the temperature of the fluid mixture, the thermostat must be immersed in the mixture, and the mixture must have a substantially uniform temperature throughout rather than consisting merely of hot and cold pockets. Baffles 31 of the present invention create a vortex in the fluid flow so that the hot and cold fluids remain in contact longer, leading to complete mixing resulting in a substantially uniform fluid mixture and temperature prior to flowing around the immersed thermostat. In this manner, higher flow rates are achieved with only a minimal pressure drop between the valve inlet and outlet.

The mixing dome 29 is shown in more detail in FIG. 2. The housing 32 defines the mixing chamber 30 therein and a flow path 33 therethrough. The housing 32 is provided with a mating surface 35 and an annular flange 36 that enable the housing to be mated to flow control valve 14 by conventional means. Housing 32 also defines an opening 37 at its top which permits an adjustment means, such as screw 27 and shaft 28, to be connected to the thermostat, as better shown in FIG. 1. In operation, the fluid leaving flow control valve 14 enters housing 32 through inlet 34. Immediately afterwards, the fluid encounters baffles 38, 39 and 40 in successive order. The fluid mixture then continues upward along flow path 33 until finally exiting housing 32 through outlet 13.

The outlet 13 is positioned at the end of the mixing chamber or fluid flow path to ensure that the thermostat 26 is substantially immersed in the fluid exiting the valve assembly 10. Moreover, the thermostat 26 is disposed downstream of the sequential baffles, preferably by a distance greater than the distance between successive baffles. Thus, the hot and cold fluids are substantially mixed prior to the thermostat, and substantially all of the thermostat is exposed to the fluid mixture to assure that the thermostat receives a proper indication of the temperature of the exiting fluid.

A more detailed view of each baffle is provided in the sectioned views of FIGS. 3, 4 and 5. Although not shown in FIG. 2, it should be noted that if the vertical spacing of the baffles is sufficiently close, the baffles will overlap so that a section taken through the housing will encompass more than one baffle. As best shown in FIG. 5, each baffle is preferably curved in shape having a rounded first end 44 and a second end 46 that tapers into the wall of the housing 32. The baffles run about 210 degrees end to end. Each baffle is angled downward counter to the direction of fluid flow, preferably at an angle of about 70 degrees as shown in FIG. 2. This arrangement imparts a turning action on the fluid stream, facilitating mixing of the hot and cold fluids. The baffles are most preferably arranged so that the tapered end 46 of the baffles meet the fluid first. This minimizes turbulence and reduces pressure drop as the fluid maintains laminar flow along the gradually widening baffle. The housing 32 and baffles may be manufactured by conventional casting techniques, such as sand casting.

Each baffle is rotationally displaced from each adjacent baffle to produce a helical arrangement of baffles 38, 39 and 40 in flow path 33. In this embodiment, each successive baffle is rotated through an angle 48, which in the illustrated embodiment is 120 degrees, to produce a generally helical flow path through the baffles. The helical pattern of successive baffles creates an overall amount of mixing which is greater than the sum of the individual baffles acting alone and without excessive pressure drop.

In one specific embodiment of the invention, the housing 32 is of sand-cast bronze and defines a cylindrical mixing chamber 2.0 inches in diameter and about 10.0 inches in length from the base of the mixing chamber to the center of the outlet opening 13. The baffles in this specific embodiment can be spaced about 1 inch apart. Each baffle can have a maximum width of about ⅝ inches. Each baffle can have a total surface area that is about one-half the cross sectional area of the chamber.

Preferably, the baffles define an unobstructed center opening 49 along the subtended length of the housing. In a specific embodiment, this opening 49 can have a diameter of ¾ inches for a 2 inch housing In a most preferred embodiment, the baffles assume a "paisely" shape to create the center opening and provide a smooth flow transition up each baffle. The valve assembly 10 of the specific embodiment is capable of accurately controlling the outlet fluid temperature at flows of 2–80 g.p.m. The fluid mixing provided by the baffles is particularly important at the low flow rates since the fluid flow can "short-circuit" the thermostat in which the entire thermostat is not immersed in the fluid flow prior to the outlet 13.

Another embodiment of the invention is shown the mixing dome 29 shown in FIG. 6. The housing 32 defines the mixing chamber 30 therein and a flow path 33 therethrough as previously described.

A more detailed view of each baffle in this embodiment is provided in the sectioned views of FIGS. 7, 8 and 9. Each baffle is crescent shaped and is angled downward counter to the direction of fluid flow, preferably at an angle of between 45 and 70 degrees. Again, the housing 32 and baffles 38', 39', and 40' may be manufactured by conventional casting techniques, such as sand casting.

Each baffle is rotationally displaced from each adjacent baffle to produce a helical arrangement of baffles 38', 39' and 40' in flow path 33. In this embodiment, each successive baffle is rotated through an angle 48', which in this case is about 45 degrees, to produce a generally helical flow path through the baffles. Each baffle defines a chord 41, 42, and 43 between its end points which is useful in illustrating the helical arrangement of the baffles in the flow path. In FIGS. 7–9, chords 42, 42, and 43 are show with their respective perpendicular bisectors successively rotated by an angle of about 45 degrees. The helical pattern of successive baffles creates an overall amount of mixing which is greater than the sum of the individual baffles acting alone and without excessive pressure drop.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

For instance, in the preferred embodiment, the baffles 38, 39 and 40 are integrally formed in the housing 32 by known casting techniques. The invention further contemplates that each baffle constitutes a separate element that is suitably mounted within a cylindrical cavity in the housing. For instance, the separate baffles could be snap fitted within grooves formed in the housing.

Moreover, the invention contemplates incorporating additional baffles sequentially disposed along the flow path. Multiple housing sections can be combined, and more baffles can be added to the longer chamber. The additional baffles would preferably be arranged in the helical pattern described above. Thus, while the baffles of the preferred embodiment are rotated 120 degrees relative to each other, the addition of more baffles permit smaller relative angular displacements between consecutive baffles.

What is claimed is:

1. A thermostatic control valve assembly for mixing a hot fluid and a cold fluid for discharge at a controlled temperature, the valve assembly comprising:
   a cold fluid inlet;
   a hot fluid inlet;
   a flow control valve for controllably mixing hot and cold fluid received through said hot fluid inlet and said cold fluid inlet, respectively;
   a housing defining a fluid outlet and a mixing chamber providing a fluid flow path between said flow control valve and said outlet;
   at least two baffles sequentially arranged and angularly displaced from each other in said flow path within said housing for turning the fluid flow through the mixing chamber, each of said baffles projecting at a non-perpendicular angle into said flow path; and
   a thermostat disposed within said mixing chamber between said at least two baffles and said fluid outlet and operably connected to said flow control valve to control said flow control valve in response to the temperature of fluid flowing through said mixing chamber.

2. The thermostatic control valve assembly of claim 1 further including a third baffle angularly displaced from each of said at least two baffles.

3. The thermostatic control valve assembly of claim 2 wherein said baffles project at an angle of about 70 degrees.

4. The thermostatic control valve assembly of claim 2 wherein said baffles define an arcuate inner edge.

5. The thermostatic control valve assembly of claim 4 wherein said baffles define a paisley shape.

6. The thermostatic control valve assembly of claim 5, wherein each of said baffles is consecutively angularly displaced by an angle of about 120 degrees.

7. The thermostatic control valve assembly of claim 4 wherein said baffles define a crescent shape.

8. The thermostatic control valve assembly of claim 7, wherein each of said baffles is consecutively angularly displaced by an angle of about 45 degrees.

9. A mixing dome for use in a thermostatic control valve assembly having a hot fluid inlet, a cold fluid inlet, a thermostatically controlled flow control valve combining hot and cold fluid received through the respective inlets, a thermostat operably coupled to the flow control valve for adjusting the amount of hot and cold fluid combined in response to the temperature of the fluid mixture, said mixing dome comprising:
   a housing defining an inlet, an outlet and a mixing chamber providing a fluid flow path between said inlet and said outlet;
   at least two baffles sequentially arranged and angularly displaced in said flow path and integrally formed in said housing for turning the fluid flow through the mixing chamber, each of said baffles projecting at a non-perpendicular angle into said flow path;
   wherein said inlet of said housing is configured to mate with the outlet of the flow control valve; and
   wherein said mixing chamber is sized to receive the thermostat between said at least two baffles and said outlet of said housing.

10. The mixing dome of claim 9 further including a third baffle angularly displaced from each of said at least two baffles.

11. The mixing dome of claim 10, wherein said baffles project at an angle of about 70 degrees.

12. The mixing dome of claim 10 wherein said baffles define an arcuate inner edge.

13. The mixing dome of claim 12 wherein said baffles define a paisley shape.

14. The mixing dome of claim 13, wherein each of said baffles is consecutively angularly displaced by an angle of about 120 degrees.

15. The mixing dome of claim 12 wherein said baffles define a crescent shape.

16. The mixing dome of claim 15, wherein each of said baffles is consecutively angularly displaced by an angle of about 45 degrees.

17. A mixing dome for a thermostatic control valve assembly comprising:

an elongated cylindrically shaped housing open at one end and defining a cavity therein for receiving a thermostat and also defining an outlet opening to said cavity remotely located from said one end, said one end having means for mating said housing to a flow control valve, said housing including at least two baffles integrally formed therein, sequentially positioned and angularly displaced within said cavity near said one end, and each of said at least two baffles projecting at a non-perpendicular angle from said housing.

18. The mixing dome of claim 17 further including a third baffle angularly displaced from each of said at least two baffles.

19. The mixing dome of claim 18, wherein said baffles project at an angle of about 70 degrees.

20. The mixing dome of claim 18 wherein said baffles define an arcuate inner edge.

21. The mixing dome of claim 20 wherein said baffles define a paisley shape.

22. The mixing dome of claim 21, wherein each of said baffles is consecutively angularly displaced by an angle of about 120 degrees.

23. The mixing dome of claim 20 wherein said baffles define a crescent shape.

24. The mixing dome of claim 23 wherein each of said baffles is consecutively angularly displaced by an angle of about 45 degrees.

25. A mixing dome for a thermostatic control valve assembly comprising:

an elongated cylindrically shaped housing open at one end and defining a cavity therein for receiving a thermostat and also defining an outlet opening to said cavity remotely located from said one end, said one end having means for mating said housing to a flow control valve, and said housing including at least two baffles integrally formed therein, sequentially positioned and angularly displaced within said cavity near said one end, each said baffle exhibiting a curved inner edge wherein said baffles cooperate to create a substantially cylindrical unobstructed central flow path within said cavity, and wherein each of said baffles project at a non-perpendicular angle from said housing.

26. The mixing dome of claim 25, wherein said baffles project at an angle of about 70 degrees.

27. A mixing dome for a thermostatic control valve assembly comprising:

an elongated cylindrically shaped housing open at one end and defining a cavity therein for receiving a thermostat and also defining an outlet opening to said cavity remotely located from said one end, said one end having means for mating said housing to a flow control valve, and said housing including at least two helically arranged baffles integrally formed therein, sequentially positioned and angularly displaced within said cavity near said one end, wherein said baffles cooperate to create a substantially cylindrical unobstructed central flow path within said cavity.

* * * * *